3,053,913
SEPARATION OF HIGH MOLECULAR WEIGHT HYDROCARBONS WITH MOLECULAR SIEVES
Matthew S. Norris, West Deer Township, Allegheny County, Pa., assignor to Gulf Research & Development Company, Pittsburgh, Pa., a corporation of Delaware
No Drawing. Filed Jan. 21, 1959, Ser. No. 788,047
7 Claims. (Cl. 260—676)

This invention relates to a method of separation and more particularly to a method of separating straight chain hydrocarbons of high molecular weight from non-straight chain compounds by the use of molecular sieve adsorbents.

It is advantageous for many purposes to separate mixtures of organic compounds such as hydrocarbon mixtures into fractions of different molecular types. One way to do this is to separate the mixtures with selective adsorbents. A valuable class of adsorbents for this purpose comprises certain crystalline, dehydrated zeolites, known as "molecular sieves," which have the ability to adsorb certain types of molecules such as straight chain paraffins while rejecting other types of molecules. This property of the sieves can be relied on for separating a mixture containing straight chain hydrocarbons and other hydrocarbons to produce a product of reduced straight chain hydrocarbon content and another product enriched in straight chain hydrocarbons.

As is known in the art, molecular sieves are crystalline dehydrated zeolites, natural or synthetic, having a well defined physical structure. Chemically, these zeolites are hydrous alumino-silicates generally containing one or more sodium, potassium, strontium, calcium or barium cations, although zeolites containing hydrogen, ammonium or other metal cations are also known. These zeolites have a characteristic three-dimensional alumino-silicate anionic network, the cations neutralizing the anionic charge. Upon dehydration, the three-dimensional lattice network of the crystal is maintained, leaving intercommunicating channels, pores or interstices of molecular dimensions within the crystal lattice. The cross-sectional diameter of such channels can vary, dehydrated three-dimensional zeolites having channels with cross-sectional diameters of about 4, 5, 6, 10 and 13 angstrom units being known. However, for each zeolite of this type, the narrowest cross-sectional diameter of the channels is a characteristic and is substantially uniform and fixed throughout the crystal. Thus, materials are available having channel diameters of substantially all 4 angstrom units, all 5 angstrom units or all 6 angstrom units, etc., as the case may be. It is, therefore, conventional in the art to characterize the crystalline, dehydrated three-dimensional zeolites as molecular sieves of a definite channel diameter, for example, molecular sieves having a channel diameter of 5 angstrom units, or even more simply, 5 angstrom molecular sieves.

It is known in the art to use molecular sieves for separating straight chain and non-straight hydrocarbons. For instance, it is known to use 5 angstrom molecular sieves for separating mixtures of normal and branched chain paraffins of low molecular weight. The conventional procedure is to percolate a mixture of the straight and branched chain paraffins through a column of pelleted molecular sieves. The normal paraffins are of small enough molecular dimensions to enter the 5 angstrom diameter channels of the molecular sieves. They are adsorbed in the channels and are strongly held by the sieves but the branched chain paraffins, being of larger molecular dimensions, are not adsorbed. They pass through the column of molecular sieves and are recovered as percolate. The charging of the mixture is continued until the molecular sieves are substantially saturated with adsorbed straight chain paraffins. Thereafter, the material remaining in the column is desorbed by heating or purging the column of molecular sieves with a hot stripping gas such as steam. In some instances the desorption is aided by drawing a vacuum on the outlet end of the adsorbent column. By the conventional procedure two products are obtained. The first product is the percolate which is enriched in branched chain paraffins. The second is the desorbed product comprising the desorbed normal paraffins and a portion of the unadsorbed liquid which is occluded in the void spaces of the column and is removed from the column with the adsorbed straight chain paraffins during the desorption stage.

I have found that the conventional procedures are unsatisfactory for my purpose of substantially complete separation of high molecular weight straight chain hydrocarbons from mixtures with non-straight chain compounds. Thus, the conventional practice of recovering the unadsorbed product from the molecular sieves merely by percolation has the disadvantage that the unadsorbed material is not completely recovered from the sieves before removal of the adsorbed material begins. At least a minor part of the unadsorbed material remains occluded in the adsorbent column and is recovered in admixture with the adsorbed material when the latter is desorbed. Thus, the maximum yield of unadsorbed product is not obtained and the adsorbed product when subsequently desorbed is contaminated with at least a minor amount of unadsorbed material.

The conventional practice of desorbing the molecular sieves by heating or purging with a hot gas has the disadvantage of causing decomposition of high molecular weight straight chain paraffins and/or polymerization of high molecular weight straight chain olefins. The likelihood of these undesired reactions occurring at elevated desorbing temperatures is increased by the fact that the molecular sieves serve to catalyze the decomposition and polymerization reactions. Aside from the decomposition problem, I have also found it extremely difficult to remove completely the adsorbed high molecular weight paraffins from molecular sieves by gas purging. It is particularly difficult to obtain complete removal of the adsorbed heavy hydrocarbons if steam or water is used for desorption. A possible explanation is that highly polar substances, such as water, are strongly held by the molecular sieves and block the channels from which the straight chain hydrocarbons must be desorbed. Accordingly, complete recovery of the straight chain product is impossible and complete regeneration of the sieves for the next adsorption stage is rendered difficult.

I have now developed an improvement in the use of molecular sieve adsorbents for separating high molecular weight straight chain hydrocarbons from mixtures with non-straight chain compounds. My method in general comprises contacting a charge mixture containing high molecular weight straight chain hydrocarbons and non-straight chain organic compounds with a molecular sieve adsorbent bed that is selective for adsorption of straight chain hydrocarbons. The amount of mixture contacted with the adsorbent is insufficient to saturate completely the adsorptive capacity for the straight chain hydrocarbons. After contact with the charge mixture the adsorbent bed is eluted with a liquid branched chain paraffin, preferably an isoparaffin of the $C_4$–$C_8$ range such as isopentane, which elutes a product comprising substantially all of the non-straight chain components of the charge mixture. Thereafter, the adsorbent is contacted with a liquid straight chain paraffin, preferably a normal paraffin of the $C_4$–$C_8$ range such as n-pentane, at a temperature insufficient to cause decomposition of the adsorbed straight chain hydrocarbons. By eluting the adsorbent with a straight chain paraffin the straight chain hydrocarbons are removed from the channels of the sieves and a product comprising substantially all of the straight chain hydrocarbons of the original mixture is recovered.

In separating high molecular weight normal paraffins from a mixture containing the same, as for example, an oil fraction comprising a mixture of $C_{18}$ to $C_{22}$ hydrocarbons of different types, the oil is charged to a column of molecular sieves in an amount insufficient to saturate the adsorptive capacity of the sieves for the straight chain hydrocarbons. A type of molecular sieves suitable for the purpose is the so-called 5 angstrom molecular sieves which preferably are in a finely divided or powdered form of, for example, from 0.5 to 5.0 microns average maximum particle diameter. The powdered sieves are disposed in a column and preferably are continuously agitated, as by means of a mechanical agitator, to insure thorough contacting of the liquids and adsorbent and to insure adequate flow of liquid through the adsorbent column.

To obtain the sharpest possible separation between the non-straight chain and straight chain hydrocarbons of the charge mixture, the weight ratio of charge to adsorbent is sufficiently low that none of the liquid flows through the column before the eluting of the column is begun. Higher charge to adsorbent ratios can be used if it is desired to allow unadsorbed liquid to percolate through the adsorbent column but in any case the charge to adsorbent ratio is sufficiently low to avoid exceeding the saturation capacity of the sieves for straight chain hydrocarbons.

Following the introduction of the charge mixture, the column is eluted wtih a large volume of a first stage eluant liquid, which preferably is a $C_4$ to $C_8$ branched chain paraffin. This type of eluant which has molecular dimensions such that it will not enter the channels of 5 angstrom molecular sieves flows through the adsorbent column without being adsorbed and washes from the column the unadsorbed non-straight chain hydrocarbons of the charge mixture. In this manner, substantially the entire content of non-straight chain hydrocarbons in the charge mixture is separated from the adsorbed straight chain components. The first stage elution is carried out at, for example, atmospheric pressure and at a temperature at which the eluant is a liquid. The branched chain eluant liquid which preferably is of much lower boiling point than the unadsorbed components of the charge mixture, is separated from the unadsorbed product by distillation or other suitable procedure.

Following the removal of the unadsorbed material from the column of molecular sieves the column is eluted with a large volume of a second stage eluant liquid which is a straight chain hydrocarbon, preferably a normal paraffin of the $C_4$ to $C_8$ range. Normal paraffins of this molecular weight range completely displace the high molecular weight $C_{13}$ to $C_{40}$ straight chain paraffins held in the channels of the 5 angstrom molecular sieves. The elution is carried out, for example, at atmospheric pressure and at a temperature at which the eluant is a liquid. By employing a sufficient amount of the second stage eluant, substantially complete removal of the high molecular weight, straight chain paraffins is accomplished. The latter can then be separated from the low boiling, straight chain eluant by distillation or other suitable procedure.

It will be noted that my new procedure avoids disadvantages of the conventional procedure that have been mentioned. For example, by completely removing the unadsorbed components of the charge mixture from the molecular sieve column before desorbing the column, a high recovery of the non-straight chain hydrocarbons is obtained and contamination of the subsequently desorbed straight chain hydrocarbons is avoided. Furthermore, all stages of my process are carried out at low or moderate temperatures well below the temperatures at which components of the charge mixture will decompose or polymerize when in contact with the molecular sieves. Still further, my procedure accomplishes substantially complete desorption of the adsorbed straight chain hydrocarbon, the straight chain eluant liquids employed for this purpose being especially adapted for displacing the adsorbed higher molecular weight hydrocarbons without blocking their exits from the channels of the molecular sieves. Still further, my procedure accomplishes these results without requiring cyclic reduction of pressure on the molecular sieves for the desorption stage.

Following the second elution stage, the sieves can be regenerated for the next adsorption cycle by removing the eluant retained in the sieves by any of the conventional desorbing procedures.

A description of specific examples will help to illustrate my procedure and its advantages. I have subjected a synthetic blend of different types of hydrocarbons of the $C_6$ to $C_{20}$ molecular weight range to separation by my procedure. The results demonstrate the feasibility of separating straight chain hydrocarbons from the non-straight chain hydrocarbons of such a mixture by means of molecular sieves and employing my procedure for removing products from the adsorbent. The procedure was as follows:

*Example 1*

The adsorbent was an alumino-silicate molecular sieve adsorbent manufactured by Linde Air Products Company and designated as Linde Type 5–A Molecular Sieves. The crystals of this adsorbent have a pore or channel diameter of about 5 angstrom units. The adsorbent was in a finely divided or powdered form having particle sizes in the range of 0.5 to 5.0 microns. The powdered adsorbent was disposed in a column and the hydrocarbon liquid mixture in the amount of about 1 part by weight per 90 parts of adsorbent was introduced to the top of the column. The composition of the charge mixture in percentages by weight was as follows:

| Straight Chain Components: | Weight Percent |
|---|---|
| n-Heptane | ---- |
| n-Tridecane | ---- |
| n-Eicosane | ---- |
| Total n-Paraffins | 30.6 |
| Octene-1 | ---- |
| Trans-3-Hexene | ---- |
| Total n-Olefins | 15.8 |
| Total Straight Chain Hydrocarbons | 46.4 |
| Non-Straight Chain Components: | |
| 2-Methyldecane | ---- |
| n-butylcyclohexane | ---- |
| Decylcyclohexane | ---- |
| Total Branched and Cyclo-Paraffins | 12.1 |
| Cyclohexene | ---- |
| 2,3,3-Trimethylbutene | ---- |
| 2,3-Dimethyl-2-Pentene | ---- |
| Total iso-Olefins | 6.5 |
| Benzene | 35.0 |
| Total Non-Straight Chain Hydrocarbons | 53.6 |

The amount of the charge liquid was insufficient to cause percolate to issue from the bottom of the column. After introduction of the charge the column was eluted with isopentane at atmospheric pressure and about 72° F. The weight ratio of isopentane to adsorbent was about 2:1. The liquid effluent from the column was recovered and isopentane was removed from the product by fractional distillation. The resulting product, comprising substantially all of the non-straight chain components of the charge mixture, amounted to 52.9 weight percent of the charge mixture, as compared with 53.6 weight percent in the charge. The adsorbed straight chain paraffins amounted to 47.1 weight percent of the charge as compared with 46.4 weight percent in the charge mixture.

The above example indicates excellent correlation between product recovery and the known composition of the charge mixture. It shows that non-straight chain hydrocarbons can be removed from straight chain paraffins, including the high molecular weight $C_{20}$ paraffin, n-eicosane, by my procedure of eluting the molecular sieves with an isoparaffin.

I have also performed operations that demonstrate that my procedure of eluting with a low molecular weight n-paraffin a molecular sieve column containing an adsorbed $C_{13}$ or higher straight chain paraffin substantially completely desorbs the adsorbed paraffin at moderate temperature and atmospheric pressure. The following examples describe such operations.

*Example 2*

A 5 angstrom molecular sieve adsorbent, as described in Example 1, containing adsorbed n-tridecane in the amount of about 1 part by weight per 10 parts of adsorbent was desorbed in accordance with my procedure. The powdered adsorbent, while being continuously agitated by means of a mechanical agitator, was eluted with n-pentane at atmospheric pressure and a temperature of about 95° F. The effluent from the column of molecular sieves was distilled to separate the n-pentane eluant which was condensed and recycled to the top of the column. After several volumes of pentane per volume of adsorbent had percolated through the adsorbent column the eluted product was separated from the n-pentane by distillation. The recovery of n-tridecane amounted to 97 weight percent of the amount adsorbed on the molecular sieves. This demonstrates that a high molecular weight $C_{13}$ n-paraffin can be substantially entirely recovered from a column of 5 angstrom molecular sieves by my procedure of eluting a column of agitated powdered molecular sieves with n-pentane.

*Example 3*

A column of powdered 5 angstrom molecular sieves, such as described in the previous examples, was contacted with a liquid mixture consisting of about five volumes of isopentane and one volume of n-eicosane. The amount of mixture introduced to the column was insufficient to cause any liquid to percolate from the column before the subsequent elution of the column and was equivalent to a weight ratio of n-eicosane to the adsorbent of about 1:10. After introduction of the charge mixture the column was eluted with isopentane at atmospheric pressure and a temperature of about 72° F., the amount of isopentane being about five times the volume of the charge mixture. The effluent from the column consisted entirely of isopentane, thus indicating that the $C_{20}$ normal paraffin was selectively adsorbed by the 5 angstrom molecular sieves. The column was then eluted with n-pentane at atmospheric pressure and a temperature of about 95° F. The n-pentane was distilled from the effluent and after condensation was recycled to the top of the adsorbent column. During the elution stage with n-pentane the powdered adsorbent in the column was continuously and turbulently agitated by means of a mechanical agitating or stirring device. After several volumes of n-pentane per volume of adsorbent had passed through the column, the eluted n-eicosane was recovered and separated from the pentane. The recovery of n-eicosane was approximately 100 weight percent of the amount originally charged to the column in admixture with isopentane.

I have mentioned that my separation process is applicable to separation of high molecular weight straight chain hydrocarbons from mixtures of the same with non-straight chain compounds. By the term "high molecular weight straight chain hydrocarbons" I mean to include hydrocarbons having at least 13 carbon atoms in the molecule and including hydrocarbons having as many as 40 or more carbon atoms in the molecule. Such hydrocarbons are characterized by the fact that they are difficult to remove from molecular sieve adsorbents by conventional means and are susceptible to decomposition at temperatures conventionally employed for desorbing molecular sieves. These high molecular weight straight chain hydrocarbons include normal paraffins, olefins and acetylenic hydrocarbons. Any of these straight chain hydrocarbons that are selectively adsorbed in molecular sieve channels from mixtures with non-straight chain compounds can advantageously be recovered from the sieves by my procedure. However, my method is most suitable for recovery of high molecular weight normal paraffins and if employed for recovery of unsaturated high molecular weight straight chain hydrocarbons, the desorbing eluant will usually have to be stronger in desorbing power than the light normal paraffins that are preferred for desorbing heavy normal paraffins.

The specific examples disclose particular mixtures containing high molecular weight straight chain hydrocarbons that can be separated by my process. My procedure is applicable to separation of other mixtures containing high molecular weight straight chain hydrocarbons, including heavy hydrocarbon fractions such as lubricating and wax fractions of petroleum oil. Such mixtures containing high molecular weight paraffinic or olefinic hydrocarbons having from 13 to about 40 carbon atoms in the molecule, can advantageously be separated by my procedure.

I have described the use of branched chain paraffins for the first elution stage of my process. An essential characteristic of the first eluant is that its molecular structure is such that it will not enter the channels of the molecular sieves. It also must be readily removable from the column of molecular sieves in the second elution stage. Branched chain paraffins of the $C_4$ to $C_8$ range and mixtures thereof possess these characteristics and are preferred. However, higher molecular weight branched chain paraffins and other non-straight chain eluant liquids can be used, including naphthenes such as cyclopentane and cyclohexane and aromatics such as benzene and toluene. Preferably, the eluant liquid is of sufficiently low boiling point to be easily separable from the eluted nonadsorbed product.

The second stage eluants used from my process are straight chain hydrocarbons, preferably normal paraffins of the $C_4$ to $C_8$ molecular weight range or mixtures of the same. An essential characteristic of the second stage eluant is its ability to enter the channels of the molecular sieves to displace adsorbed hydrocarbons. It must also be easily removable from the sieves when the sieves are regenerated, as for example, by heating. If my procedure is applied to separation of mixtures containing certain high molecular weight unsaturated hydrocarbons, the normal paraffins that are generally preferred as the second stage eluant may not completely desorb the adsorbed unsaturates from the molecular sieves at moderate temperature. For such difficultly desorbable unsaturates an unsaturated straight chain hydrocarbon, such as a $C_4$ to $C_8$ normal olefin, can be used as the second stage eluant. The unsaturates are more strongly adsorbed than the n-paraffins and can displace materials from the sieves that cannot readily be removed by paraffinic eluants. However, unsaturates are also more difficult to remove from the sieves than a paraffinic eluant when regenerating the sieves. Therefore, whenever possible, the preferred straight chain paraffins are used as second stage eluants.

I have described the use of 5 angstrom molecular sieves. This type of absorbent is successful in separating a large range of straight chain and branched chain hydrocarbons and is preferred for the separations described. However, my procedure of removing products from molecular sieves is applicable for use with any size of molecular sieves suitable for the particular separation being practiced.

I have described a preferred modification of my process in which the charge to adsorbent ration is so low that none of the charge percolates through the adsorbent before the first eluant is introduced. The use of such a low charge to adsorbent ratio is preferred for obtaining the highest degree of separation of the charge mixture, each product being recovered by elution from the bed rather than by percolation. However, my procedure for recovering products from the molecular sieve column is applicable also to separations in which the charge to adsorbent ratio is large enough to cause some unadsorbed material to percolate through the column before the first eluant is introduced. The controlling factors are the adsorptive capacity of the sieves and the amount of adsorbable material in the charge mixture. The amount of adsorbable material, that is to say, straight chain hydrocarbons, must not exceed the adsorptive capacity of the sieves.

It is an advantage of my process that it can operate at atmospheric pressure and that it is unnecessary to draw a vacuum on the column during the desorption phases. The temperatures employed will be governed by the temperature employed will be governed by the characteristics of the materials being separated. The temperature must be such that the eluants are in the liquid phase. In a preferred embodiment of the process in which the eluant is distilled from the eluted material and is recycled to the molecular sieve column, the eluant will normally be at a temperature only slightly below its boiling point. The temperature must be below that which would lead to decomposition or polymerization of the material undergoing separation when in contact with the molecular sieves.

From the foregoing description it will be seen that I have developed a new procedure for separating $C_{13}$ or higher molecular weight straight chain hydrocarbons from mixtures of the same with non-straight chain hydrocarbons. The procedure is especially valuable in being able to separate $C_{20}$ and higher molecular weight straight chain hydrocarbons from non-straight chain compounds, the $C_{20}$ and higher hydrocarbons being especially difficult to separate by conventional methods. My new method yields a product consisting almost entirely of the straight chain components of the mixture and another product substantially free of straight chain compounds. This result is accomplished without employing high temperatures that would decompose the high molecular weight hydrocarbons and in a manner that permits complete regeneration of the sieves for the next adsorption cycle without forming deactivating decomposition products in the sieves.

Obviously many modifications and variations of the invention as hereinbefore set forth may be made without departing from the spirit and scope thereof and therefore only such limitations should be imposed as are indicated in the appended claims.

I claim:

1. The method for separating high molecular weight straight chain hydrocarbons from a mixture of the same with non-straight chain organic compounds which comprises contacting such mixture containing straight chain hydrocarbons having at least 13 carbon atoms in the molecule with a molecular sieve adsorbent in an amount insufficient to saturate the adsorptive capacity of the adsorbent for the straight chain hydrocarbons, eluting the molecular sieve adsorbent with a branched chain paraffin eluant liquid to remove unadsorbed components of the mixture from the adsorbent, said branched chain paraffin eluant liquid having a boiling point lower than the boiling point of the unadsorbed components of the charge mixture, thereafter eluting the adsorbent with a straight chain hydrocarbon eluant liquid to remove adsorbed straight chain hydrocarbons from the adsorbent, thereby recovering substantially all of the straight chain hydrocarbon components of the mixture separately from the non-straight chain components of the mixture, the contacting of the adsorbent with the mixture and with the eluant liquids being carried out at a temperature substantially below the temperautre of decomposition of said high molecular weight straight chain hydrocarbons when in contact with the molecular sieve adsorbent.

2. The method for separating high molecular weight straight chain hydrocarbons from a mixture of the same with non-straight chain organic compounds which comprises contacting such a mixture containing at least one $C_{13}$ to $C_{40}$ straight chain hydrocarbon with a 5 angstrom molecular sieve adsorbent in an amount insufficient to saturate the adsorptive capacity of the adsorbent for the straight chain hydrocarbons, eluting the molecular sieve adsorbent with a $C_4$ to $C_8$ branched chain paraffin eluant liquid to remove unadsorbed components of the mixture from the adsorbent, thereafter eluting the adsorbent with a $C_4$ to $C_8$ straight chain paraffin eluant liquid to remove adsorbed straight chain hydrocarbons from the adsorbent, thereby recovering substantially all of the straight hydrocarbon components of the mixture separately from the non-straight chain components of the mixture, the contacting of the adsorbent with the mixture and with the eluant liquids being carried out at a temperature substantially below the temperature of decomposition of said high molecular weight straight chain hydrocarbons when in contact with the molecular sieve adsorbent.

3. The method according to claim 2 in which the mixture to be separated is contacted with the molecular sieve adsorbent in an amount insufficient to cause any of the mixture to percolate through the adsorbent before eluting the adsorbent with the branched chain paraffin eluant liquid.

4. The method according to claim 2 in which said mixture contains n-eicosane, said n-eicosane being recovered substantially entirely separated from non-straight chain components of the mixture.

5. The method for separating high molecular weight straight chain hydrocarbons from a mixture of the same with non-straight chain organic compounds which comprises contacting such a mixture which contains at least one straight chain hydrocarbon having at least 20 carbon atoms in the molecule with a 5 angstrom molecular sieve adsorbent in an amount insufficient to saturate the adsorptive capacity of the adsorbent for the straight chain hydrocarbons, eluting the molecular sieve adsorbent with liquid isopentane at atmospheric pressure to remove unadsorbed components of the mixture from the adsorbent, thereafter eluting the adsorbent at atmospheric pressure with liquid n-pentane to remove adsorbed straight chain hydrocarbons from the adsorbent, thereby recovering substantially all of the straight chain hydrocarbon components of the mixture separately from the non-straight chain components of the mixture.

6. The method according to claim 5 in which the molecular sieve adsorbent is in powdered form and is continuously agitated during the elution with n-pentane.

7. The method for separating high molecular weight straight chain hydrocarbons from a mixture of the same with non-straight chain organic compounds which comprises contacting such a mixture containing at least one $C_{13}$ to $C_{40}$ straight chain hydrocarbon with a 5 angstrom molecular sieve adsorbent in an amount insufficient to saturate the adsorptive capacity of the adsorbent for the straight chain hydrocarbons, eluting the molecular sieve adsorbent with a $C_4$ to $C_8$ branched chain paraffin eluant liquid to remove unadsorbed components of the mixture from the adsorbent, then eluting the adsorbent with a $C_4$ to $C_8$ straight chain paraffin eluant liquid to remove adsorbed straight chain hydrocarbons from the adsorbent, thereby recovering substantially all of the straight chain hydrocarbon components of the mixture separately from the non-straight chain components of the mixture, the contacting of the adsorbent with the mixture and with the eluant liquids being carried out at a temperature substantially below the temperature of decomposition of said high molecular weight straight chain hydrocarbons when in contact with the molecular sieve adsorbent and the elution of said molecular sieve adsorbent being performed in each instance with liquids that are substantially free of highly polar substances.

References Cited in the file of this patent

UNITED STATES PATENTS

| | | |
|---|---|---|
| 2,521,357 | Furnoy | Sept. 5, 1950 |
| 2,818,449 | Christensen et al. | Dec. 31, 1957 |
| 2,859,256 | Hess et al. | Nov. 4, 1958 |
| 2,881,862 | Fleck et al. | Apr. 14, 1959 |
| 2,889,893 | Hess et al. | June 9, 1959 |
| 2,904,507 | Jahnig | Sept. 15, 1959 |
| 2,912,473 | Hutchings | Nov. 10, 1959 |
| 2,920,037 | Haensel | Jan. 5, 1960 |
| 2,920,038 | Feldbauer et al. | Jan. 5, 1960 |
| 2,966,531 | Louis | Dec. 27, 1960 |
| 3,007,863 | Hess et al. | Nov. 7, 1961 |

UNITED STATES PATENT OFFICE
CERTIFICATE OF CORRECTION

Patent No. 3,053,913            September 11, 1962

Matthew S. Norris

It is hereby certified that error appears in the above numbered patent requiring correction and that the said Letters Patent should read as corrected below.

Column 7, line 2, for "ration" read -- ratio --; line 23, strike out "temperature employed will be governed by the"; column 8, line 4, for "temperautre" read -- temperature --.

Signed and sealed this 15th day of January 1963.

(SEAL)
Attest:

ERNEST W. SWIDER            DAVID L. LADD
Attesting Officer            Commissioner of Patents